United States Patent
Niu et al.

(10) Patent No.: US 12,007,827 B2
(45) Date of Patent: Jun. 11, 2024

(54) TERMINAL POWER SAVING METHOD AND APPARATUS

(71) Applicant: HUAWEI TECHNOLOGIES CO., LTD., Shenzhen (CN)

(72) Inventors: Xiangyu Niu, Shenzhen (CN); Xiaowei Ma, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/641,581

(22) PCT Filed: Sep. 10, 2020

(86) PCT No.: PCT/CN2020/114450
§ 371 (c)(1),
(2) Date: Mar. 9, 2022

(87) PCT Pub. No.: WO2021/047582
PCT Pub. Date: Mar. 18, 2021

(65) Prior Publication Data
US 2022/0300058 A1 Sep. 22, 2022

(30) Foreign Application Priority Data
Sep. 11, 2019 (CN) .................. 201910859145.X

(51) Int. Cl.
*G06F 1/329* (2019.01)
*G06F 9/48* (2006.01)
*G06F 9/50* (2006.01)

(52) U.S. Cl.
CPC ............ *G06F 1/329* (2013.01); *G06F 9/4856* (2013.01); *G06F 9/5094* (2013.01)

(58) Field of Classification Search
CPC ....... G06F 1/329; G06F 9/4856; G06F 9/5094
See application file for complete search history.

(56) References Cited

U.S. PATENT DOCUMENTS

| | | | |
|---|---|---|---|
| 7,929,999 B2 | 4/2011 | Ban et al. | |
| 9,733,688 B2 * | 8/2017 | Hsiao | G06F 1/3287 |
| 9,874,924 B1 * | 1/2018 | Li | G06F 9/5088 |
| 10,664,324 B2 * | 5/2020 | Gross | H04L 47/822 |
| 2003/0182348 A1 * | 9/2003 | Leong | G06F 3/0601 |
| | | | 718/100 |
| 2012/0131573 A1 * | 5/2012 | Dasari | G06F 9/5077 |
| | | | 718/1 |
| 2012/0324259 A1 * | 12/2012 | Aasheim | H04W 52/0258 |
| | | | 713/340 |
| 2013/0205158 A1 | 8/2013 | Lin et al. | |

(Continued)

FOREIGN PATENT DOCUMENTS

| | | |
|---|---|---|
| CN | 101615168 A | 12/2009 |
| CN | 102026346 A | 4/2011 |

(Continued)

*Primary Examiner* — Aurel Prifti
(74) *Attorney, Agent, or Firm* — Rimon PC

(57) ABSTRACT

The method includes: a primary terminal may select a target secondary terminal from at least one secondary terminal when detecting that the primary terminal currently runs a power consuming process and/or will run a power consuming process, and migrate the currently running power consuming process and/or the to-be-run power consuming process to the target secondary terminal.

17 Claims, 4 Drawing Sheets

(56) References Cited

U.S. PATENT DOCUMENTS

| | | | | |
|---|---|---|---|---|
| 2013/0290755 A1* | 10/2013 | Wolman | ............... | G06F 9/5094 |
| | | | | 713/320 |
| 2014/0075222 A1* | 3/2014 | Jackson | ................ | G06F 1/329 |
| | | | | 713/320 |
| 2014/0359310 A1* | 12/2014 | Haridass | .............. | G06F 1/3206 |
| | | | | 713/300 |
| 2015/0230172 A1* | 8/2015 | Shalunov | .......... | H04W 52/0296 |
| | | | | 370/311 |
| 2015/0301864 A1* | 10/2015 | Tseng | ................... | G06F 9/4881 |
| | | | | 718/104 |
| 2015/0381516 A1* | 12/2015 | Yan | ...................... | G06F 9/4856 |
| | | | | 709/203 |
| 2016/0062785 A1* | 3/2016 | Kumeta | .................... | G06F 1/28 |
| | | | | 718/1 |
| 2016/0092266 A1* | 3/2016 | Bavishi | ................ | G06F 9/5016 |
| | | | | 718/1 |
| 2016/0162004 A1* | 6/2016 | Ljubuncic | ............. | G06F 9/5083 |
| | | | | 713/320 |
| 2016/0179643 A1* | 6/2016 | Sun | .................... | G06F 11/1461 |
| | | | | 711/115 |
| 2016/0295010 A1 | 10/2016 | Miller | | |
| 2016/0378532 A1* | 12/2016 | Vincent | ................ | G06F 9/5088 |
| | | | | 718/1 |
| 2016/0378570 A1* | 12/2016 | Ljubuncic | ............. | G06F 9/5027 |
| | | | | 718/104 |
| 2017/0068300 A1* | 3/2017 | Banerjee | ............... | G06F 9/5094 |
| 2017/0115720 A1* | 4/2017 | McKnight | ............. | G06F 9/5094 |
| 2017/0220332 A1 | 8/2017 | Srinivasan et al. | | |
| 2018/0039519 A1* | 2/2018 | Kumar | .................. | G06F 9/4812 |
| 2019/0121660 A1* | 4/2019 | Sato | ....................... | G06F 9/5088 |
| 2019/0121663 A1* | 4/2019 | Guo | ....................... | G06F 9/45558 |
| 2019/0163540 A1* | 5/2019 | Lee | ........................ | G06F 9/5077 |
| 2019/0235895 A1* | 8/2019 | Ovesea | ................ | G06F 9/5088 |
| 2019/0235918 A1* | 8/2019 | Liu | ........................ | G06F 3/0617 |
| 2019/0278626 A1* | 9/2019 | Kodama | ............... | G06F 9/5094 |
| 2020/0133718 A1* | 4/2020 | Koehler | ................ | G06F 9/5077 |
| 2021/0019171 A1* | 1/2021 | Tong | ..................... | G06F 9/5088 |

FOREIGN PATENT DOCUMENTS

| | | |
|---|---|---|
| CN | 102868802 A | 1/2013 |
| CN | 102882565 A | 1/2013 |
| CN | 103618565 A | 3/2014 |
| CN | 104487912 A | 4/2015 |
| CN | 105208639 A | 12/2015 |
| CN | 105511880 A | 4/2016 |
| CN | 105549045 A | 5/2016 |
| CN | 106598204 A | 4/2017 |
| CN | 107272866 A | 10/2017 |
| CN | 109218521 A | 1/2019 |
| CN | 109309953 A | 2/2019 |
| EP | 2456169 A1 | 5/2012 |
| WO | 2017067586 A1 | 4/2017 |

* cited by examiner

TERMINAL POWER SAVING METHOD AND APPARATUS

CROSS-REFERENCE TO RELATED APPLICATIONS

This application is a National Stage of International Application No. PCT/CN2020/114450, filed on Sep. 10, 2020, which claims priority to Chinese Patent Application No. 201910859145.X, filed on Sep. 11, 2019. Both of the aforementioned applications are hereby incorporated by reference in their entireties.

TECHNICAL FIELD

This application relates to the field of communications technologies, and in particular, to a terminal power saving method and apparatus.

BACKGROUND

As terminal functions are increasingly powerful, terminals have entered people's work and life, and become an indispensable part of people's work and life. In the process of using a terminal, the power of a battery of the terminal is continuously consumed. Consequently, the terminal seems to be "not durable", in other words, the battery life of the terminal is relatively short. Therefore, how to improve the battery life of a terminal to enable the terminal to better serve a user is essential.

In the conventional technology, to reduce the power consumption of a battery of a terminal and improve the battery life of the terminal, software in the terminal is controlled and/or hardware in the terminal is optimized. For example, common software control solutions may include central processing unit (CPU) frequency control, process freezing, message push control, and using a global positioning system (GPS) control agent. Common hardware optimization solutions may include CPU AVS, liquid crystal display (LCD) CABL, and the like. In the example of a software solution, to reduce the power consumption of a screen of the terminal, a CPU frequency may be limited. However, limiting the CPU frequency affects it from running programs, and conflicts with the performance of the terminal.

Therefore, how to improve the battery life of a terminal without affecting its programs from running is a problem to be urgently solved by a person skilled in the art.

SUMMARY

Embodiments of this application provide a terminal power saving method and apparatus, to improve the battery life of a terminal without affecting its programs from running.

According to a first aspect, an embodiment of this application provides a terminal power saving method, applied to a primary terminal. The primary terminal is powered by a battery, the primary terminal and at least one secondary terminal are in the same network, and the terminal power saving method may include:

determining a target secondary terminal from the at least one secondary terminal when it is detected that the primary terminal currently runs a power consuming process and/or is to run a power consuming process;

migrating the currently running power consuming process and/or the to-be-run power consuming process to the target secondary terminal, to run the currently running power consuming process and/or the to-be-run power consuming process by using the target secondary terminal; and receiving a running result sent by the target secondary terminal.

It can be learned that, in this embodiment of this application, the primary terminal may determine the target secondary terminal from the at least one secondary terminal when detecting that the primary terminal currently runs a power consuming process and/or is to run a power consuming process, and migrate the currently running power consuming process and/or the to-be-run power consuming process to the target secondary terminal, to run the currently running power consuming process and/or the to-be-run power consuming process by using the target secondary terminal. In this way, the primary terminal only needs to receive the running result sent by the target secondary terminal, without running the currently running power consuming process and/or the to-be-run power consuming process, so that the power consumption of the primary terminal caused by running the currently running power consuming process and/or the to-be-run power consuming process is avoided, and the power of the primary terminal is saved, thereby improving the battery life of the terminal without affecting its programs from running.

In a possible implementation, there are at least two secondary terminals, and the determining a target secondary terminal from the at least one secondary terminal when it is detected that the primary terminal currently runs a power consuming process and/or is to run a power consuming process includes:

determining a secondary terminal list from the at least two secondary terminals in a networking process, where the secondary terminal list includes at least one secondary terminal; and determining the target secondary terminal from the secondary terminal list based on a migration condition when it is detected that the primary terminal currently runs a power consuming process and/or is to run a power consuming process, where the migration condition includes: the available power meets a power requirement of the currently running power consuming process and/or the to-be-run power consuming process, and the available resources meet a resource requirement of the currently running power consuming process and/or the to-be-run power consuming process.

It may be understood that, in this embodiment of this application, in the networking process, the secondary terminal list is determined based on the available power and the available resources that correspond to each of the at least two secondary terminals, for the purpose of performing preliminary screening on the selection of the target secondary terminal. It cannot be ensured that a secondary terminal that currently meets a preset condition can also meet the migration condition when the terminal subsequently detects that the primary terminal currently runs a power consuming process and/or is to run a power consuming process. Therefore, the target secondary terminal still needs to be determined from the secondary terminal list based on the migration condition during the determining of the target secondary terminal when the terminal subsequently detects that the primary terminal currently runs a power consuming process and/or is to run a power consuming process. It can be learned that the preliminary screening can reduce the amount of data processing for subsequently determining the target secondary terminal from the secondary terminal list based on the migration condition, to improve process migration efficiency.

In a possible implementation, the migration condition includes at least one of the following: a first-type migration condition: a power supply supplies power, there is no user operation, and the available resources of a secondary terminal are greater than the resource requirement of the currently running power consuming process and/or the to-be-run power consuming process; a second-type migration condition: a power supply supplies power, there is a user operation, and the available resources of a secondary terminal are greater than or equal to X times the resource requirements of the currently running power consuming process and/or the to-be-run power consuming process; a third-type migration condition: a power supply supplies power, the time for which there has been no user operation exceeds a preset time period, and the current time falls within a preset time period of the system; and a fourth-type migration condition: a battery supplies power, the available power of the battery is greater than Y times the power requirements of the currently running power consuming process and/or the to-be-run power consuming process, there is no user operation, and the available resources of a secondary terminal are greater than or equal to Z times the resource requirements of the currently running power consuming process and/or the to-be-run power consuming process, where all of X, Y, and Z are greater than or equal to 1; where the priorities of the migration conditions sequentially decrease in the order of the first-type migration condition, the second-type migration condition, the third-type migration condition, and the fourth-type migration condition.

It should be noted that a migration condition with a higher priority indicates a higher priority of selecting a secondary terminal that meets the migration condition. In other words, the secondary terminal that meets the migration condition is more conducive to the migration of the currently running power consuming process and/or the to-be-run power consuming process of the primary terminal, in other words, the probability of successfully running the currently running power consuming process and/or the to-be-run power consuming process of the primary terminal after the migration is larger.

In a possible implementation, the determining the target secondary terminal from the secondary terminal list based on a migration condition when it is detected that the primary terminal currently runs a power consuming process and/or is to run a power consuming process includes:

when it is detected that the primary terminal currently runs a power consuming process and/or is to run a power consuming process, starting from the first secondary terminal in the secondary terminal list, obtaining current target power and current target resources of the secondary terminal; determining whether the current target power and the current target resources of the secondary terminal meet the migration condition until a secondary terminal that meets the migration condition is determined; and determining the secondary terminal that meets the migration condition as the target secondary terminal.

It can be learned that, when the target secondary terminal is determined from the secondary terminal list based on the migration condition, in this possible implementation, provided that it is determined that one secondary terminal in the secondary terminal list meets the migration condition, the secondary terminal that currently meets the migration condition may be determined as the target secondary terminal without a need to determine whether current target power and current target resources that correspond to each secondary terminal in the secondary terminal list meet the migration condition, so that the amount of data processing is reduced, and process running efficiency is improved.

In a possible implementation, the determining the target secondary terminal from the secondary terminal list based on a migration condition when it is detected that the primary terminal currently runs a power consuming process and/or is to run a power consuming process includes:

when it is detected that the primary terminal currently runs a power consuming process and/or is to run a power consuming process, separately obtaining current target power and current target resources that correspond to each of all secondary terminals in the secondary terminal list; determining whether the current target power and the current target resources that correspond to each of all the secondary terminals in the secondary terminal list meet the migration condition; and determining the target secondary terminal from all secondary terminals that meet the migration condition.

In a possible implementation, the determining the target secondary terminal from all secondary terminals that meet the migration condition includes:

determining a migration condition type corresponding to each of all the secondary terminals that meet the migration condition; and determining, as the target secondary terminal, a secondary terminal corresponding to a migration condition type with the highest priority.

It can be learned that the secondary terminal corresponding to the migration condition type with the highest priority is determined as the target secondary terminal in this possible implementation, so that the target secondary terminal is more conducive to the migration of the currently running power consuming process and/or the to-be-run power consuming process of the primary terminal, in other words, a probability of successfully running the currently running power consuming process and/or the to-be-run power consuming process of the primary terminal on the target secondary terminal after the migration is larger, thereby further improving the process migration success rate.

In a possible implementation, the obtaining current target power and current target resources that correspond to the secondary terminal includes:

obtaining current available power and current available resources that correspond to the secondary terminal; and separately performing normalization processing on the current available power and the current available resources that correspond to the secondary terminal, to obtain the current target power and the current target resources that correspond to the secondary terminal, so that a key component corresponding to the primary terminal is equivalent to a key component corresponding to the secondary terminal, thereby improving the probability that the secondary terminal can successfully run the currently running power consuming process and/or the to-be-run power consuming process of the primary terminal.

In a possible implementation, the determining a secondary terminal list from the at least two secondary terminals in a networking process includes:

in the networking process, obtaining available power and available resources that correspond to each of the at least two secondary terminals; and determining the secondary terminal list based on the available power and the available resources that correspond to each of the at least two secondary terminals, where a secondary terminal in the secondary terminal list meets a preset condition. In this way, the secondary terminal list is first determined for preliminary screening on selection of the target secondary terminal. It cannot be ensured that a secondary terminal that currently meets the preset condition can also meet the migration condition when the terminal subsequently detects that the primary terminal currently runs a power consuming process and/or is to run a power consuming process. Therefore, the target secondary terminal still needs to be determined from the secondary terminal list based on the migration condition during determining of the target secondary terminal when the terminal subsequently detects that the primary terminal currently runs a power consuming process and/or is to run a power consuming process. It can be learned that the preliminary screening can reduce the amount of data processing for subsequently determining the target secondary terminal from the secondary terminal list based on the migration condition, to improve process migration efficiency.

According to a second aspect, an embodiment of this application further provides a terminal power saving apparatus, applied to a primary terminal. The primary terminal is powered by a battery, the primary terminal and at least one secondary terminal are in a same network, and the terminal power saving apparatus may include:
 a processing unit, configured to determine a target secondary terminal from the at least one secondary terminal when it is detected that the primary terminal currently runs a power consuming process and/or is to run a power consuming process;
 a migration unit, configured to migrate the currently running power consuming process and/or the to-be-run power consuming process to the target secondary terminal, to run the currently running power consuming process and/or the to-be-run power consuming process by using the target secondary terminal; and
 a receiving unit, configured to receive a running result sent by the target secondary terminal.

In a possible implementation, there are at least two secondary terminals, and the processing unit is specifically configured to: determine a secondary terminal list from the at least two secondary terminals in a networking process, where the secondary terminal list includes at least one secondary terminal; and determine the target secondary terminal from the secondary terminal list based on a migration condition when it is detected that the primary terminal currently runs a power consuming process and/or is to run a power consuming process, where the migration condition includes: the available power meets a power requirement of the currently running power consuming process and/or the to-be-run power consuming process, and the available resources meet a resource requirement of the currently running power consuming process and/or the to-be-run power consuming process.

In a possible implementation, the migration condition includes at least one of the following: a first-type migration condition: a power supply supplies power, there is no user operation, and the available resources of a secondary terminal are greater than the resource requirement of the currently running power consuming process and/or the to-be-run power consuming process; a second-type migration condition: a power supply supplies power, there is a user operation, and the available resources of a secondary terminal are greater than or equal to X times the resource requirements of the currently running power consuming process and/or the to-be-run power consuming process; a third-type migration condition: a power supply supplies power, a time for which there has been no user operation exceeds a preset time period, and the current time falls within a preset time period of a system; and a fourth-type migration condition: a battery supplies power, the available power of the battery is greater than Y times the power requirements of the currently running power consuming process and/or the to-be-run power consuming process, there is no user operation, and the available resources of a secondary terminal are greater than or equal to Z times the resource requirements of the currently running power consuming process and/or the to-be-run power consuming process, where all of X, Y, and Z are greater than or equal to 1; where the priorities of the migration conditions sequentially decrease in the order of the first-type migration condition, the second-type migration condition, the third-type migration condition, and the fourth-type migration condition.

In a possible implementation, the processing unit is specifically configured to: when it is detected that the primary terminal currently runs a power consuming process and/or is to run a power consuming process, starting from the first secondary terminal in the secondary terminal list, obtain current target power and current target resources of the secondary terminal; determine whether the current target power and the current target resources of the secondary terminal meet the migration condition until a secondary terminal that meets the migration condition is determined; and determine the secondary terminal that meets the migration condition as the target secondary terminal.

In a possible implementation, the processing unit is specifically configured to: when it is detected that the primary terminal currently runs a power consuming process and/or is to run a power consuming process, separately obtain current target power and current target resources that correspond to each of all secondary terminals in the secondary terminal list; determine whether the current target power and the current target resources that correspond to each of all the secondary terminals in the secondary terminal list meet the migration condition; and determine the target secondary terminal from all secondary terminals that meet the migration condition.

In a possible implementation, the processing unit is specifically configured to: determine a migration condition type corresponding to each of all the secondary terminals that meet the migration condition; and determine, as the target secondary terminal, a secondary terminal corresponding to a migration condition type with the highest priority.

In a possible implementation, the processing unit is specifically configured to: obtain current available power and current available resources that correspond to the secondary terminal; and separately perform normalization processing on the current available power and the current available resources that correspond to the secondary terminal, to obtain the current target power and the current target resources that correspond to the secondary terminal.

In a possible implementation, the processing unit is specifically configured to: in the networking process, obtain available power and available resources that correspond to each of the at least two secondary terminals; and determine the secondary terminal list based on the available power and the available resources that correspond to each of the at least two secondary terminals, where a secondary terminal in the secondary terminal list meets a preset condition.

According to a third aspect, an embodiment of this application further provides a terminal device. The terminal device may include a processor and a memory.

The memory is configured to store program instructions.

The processor is configured to execute the program instructions in the memory, so that the terminal device performs the terminal power saving method according to any implementation of the first aspect.

According to a fourth aspect, an embodiment of this application further provides a computer storage medium, including instructions. When the instructions are run by one or more processors, an electronic device performs the terminal power saving method according to any implementation of the first aspect.

According to a fifth aspect, an embodiment of this application further provides a chip. The chip stores a computer program, and the computer program is executed by a processor to perform the terminal power saving method according to any implementation of the first aspect.

It can be learned that, according to the terminal power saving method and apparatus in the embodiments of this application, the primary terminal may determine the target secondary terminal from the at least one secondary terminal when detecting that the primary terminal currently runs a power consuming process and/or is to run a power consuming process, and migrate the currently running power consuming process and/or the to-be-run power consuming process to the target secondary terminal, to run the currently running power consuming process and/or the to-be-run power consuming process by using the target secondary terminal. In this way, the primary terminal only needs to receive the running result sent by the target secondary terminal, without running the currently running power consuming process and/or the to-be-run power consuming process, so that power consumption of the primary terminal that is caused by running the currently running power consuming process and/or the to-be-run power consuming process is avoided, and power of the primary terminal is saved, thereby improving the battery life of the terminal without affecting its programs from running.

DESCRIPTION OF EMBODIMENTS

Embodiments of this application are applied to a communications system such as a public land mobile network (PLMN) system or even a 5th generation (5G) communications system or another system that may emerge in the future. For easy understanding of a person skilled in the art, the following describes some terms in this application. It should be noted that, when solutions in the embodiments of this application are applied to a 5G system or another system that may emerge in the future, names of a network device and a terminal may change, but this does not affect implementation of the solutions in the embodiments of this application.

Figure 1:
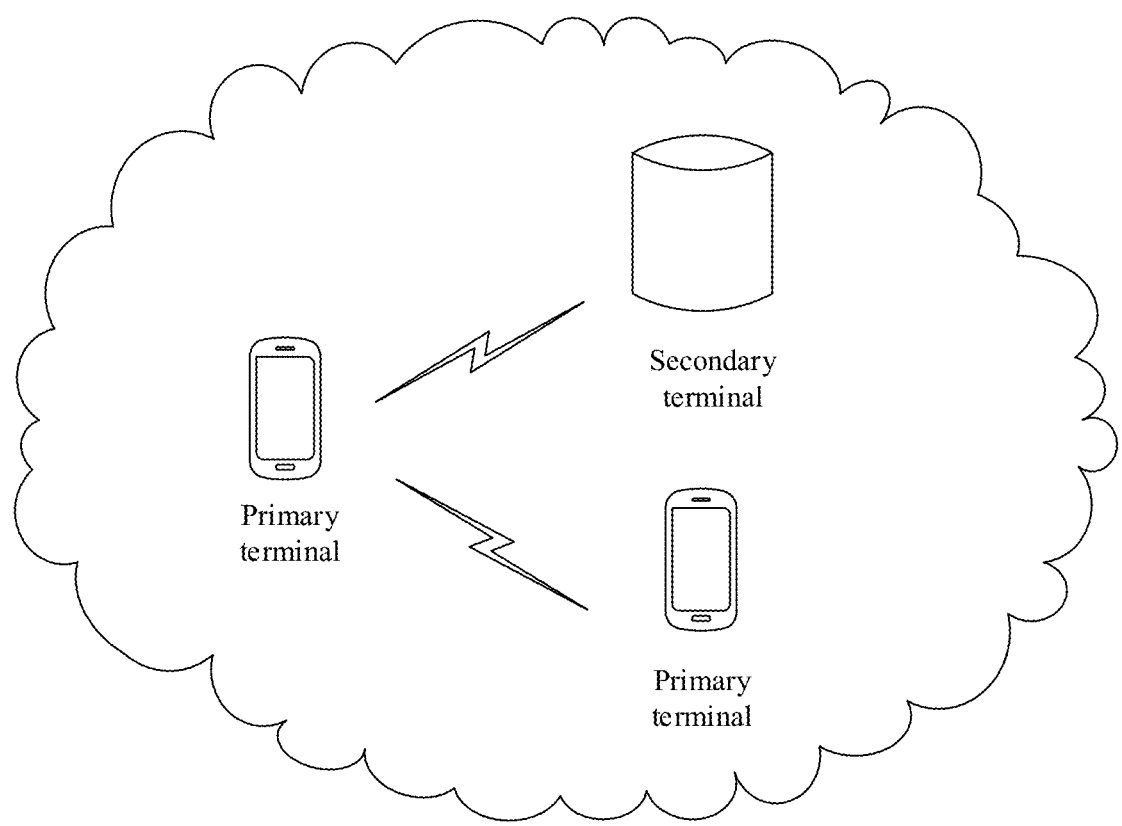
FIG. 1 is a schematic diagram of an application scenario according to an embodiment of this application.

In view of a problem in the conventional technology, to improve the battery life of a terminal without affecting its programs from running, the embodiments of this application provide a terminal power saving method. The terminal power saving method may be applied to a primary terminal powered by a battery. The primary terminal and at least one secondary terminal are in the same network, and any two devices in the network are mutually trusted devices. For example, FIG. 1 is a schematic diagram of an application scenario according to an embodiment of this application. The application scenario may include a primary terminal and at least one secondary terminal in the same network as the primary terminal. The primary terminal may determine a target secondary terminal from the at least one secondary terminal when detecting that the primary terminal currently runs a power consuming process and/or is to run a power consuming process, and migrate the currently running power consuming process and/or the to-be-run power consuming process to the target secondary terminal, to run the currently running power consuming process and/or the to-be-run power consuming process by using the target secondary terminal. In this way, the primary terminal only needs to receive a running result sent by the target secondary terminal, without running the currently running power consuming process and/or the to-be-run power consuming process, so that power consumption of the primary terminal that is caused by running the currently running power consuming process and/or the to-be-run power consuming process is avoided, and power of the primary terminal is saved, thereby improving a battery life of the terminal without affecting its programs from running.

It may be understood that in the embodiments of this application, that the primary terminal migrates the currently running power consuming process and/or the to-be-run power consuming process to the target secondary terminal may mean that the primary terminal hands over the operation of running the currently running power consuming process and/or the to-be-run power consuming process to the target secondary terminal for execution. The primary terminal only needs to receive the running result of running the currently running power consuming process and/or the to-be-run power consuming process by the target secondary terminal, without performing the operation of running the currently running power consuming process and/or the to-be-run power consuming process. When the primary terminal migrates the currently running power consuming process and/or the to-be-run power consuming process to the target secondary terminal, for example, when there are a relatively large quantity of currently running power consuming programs and/or to-be-run power consuming processes, the primary terminal may migrate the relatively large quantity of currently running power consuming processes and/or to-be-run power consuming processes to one target secondary terminal for running, or certainly, the primary terminal may migrate the currently running power consuming processes and/or the to-be-run power consuming processes to two target secondary terminals. The quantity of target secondary terminals may be specifically determined as actually required. Herein, no further limitation is set in this embodiment of this application. It should be noted that the specific method for migrating the currently running power consuming processes and/or the to-be-run power consuming processes to two target secondary terminals for running is similar to the specific method for migrating the currently running power consuming processes and/or the to-be-run power consuming processes to one target secondary terminal for running. In the embodiments of this application, the following describes an example in which one target secondary terminal is selected from at least one secondary terminal, in other words, a currently running power consuming process and/or a to-be-run power consuming process of the primary terminal are or is migrated to one target secondary terminal, but it does not indicate that the embodiments of this application are limited thereto.

It should be noted that, in the embodiments of this application, when selecting the target secondary terminal from the at least one secondary terminal in the same network as the primary terminal, the primary terminal does not randomly select a secondary terminal as the target secondary terminal. The secondary terminal needs to meet a migration condition, and only a secondary terminal that meets the migration condition can be determined as the target secondary terminal. The migration condition includes: the available power meets a power requirement of the currently running power consuming process and/or the to-be-run power consuming process, and the available resources meet a resource requirement of the currently running power consuming process and/or the to-be-run power consuming process.

(1) The terminal is also referred to as a terminal device or user equipment, and is a device that provides voice and/or data connectivity for a user, for example, a handheld device or a vehicle-mounted device that has a wireless connection function. For example, common terminal devices include a mobile phone, a tablet computer, a notebook computer, a palmtop computer, a mobile internet device (MID), and a wearable device. For example, wearable devices include a smart watch, a smart band, and a pedometer.

(2) In the embodiments of this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be singular or plural. In the descriptions of this application, the character "/" usually indicates an "or" relationship between the associated objects.

Specific embodiments are used below to describe in detail the technical solutions of this application. The following several specific embodiments may be combined with each other, and a same or similar concept or process may not be described repeatedly in some embodiments.

Figure 2:
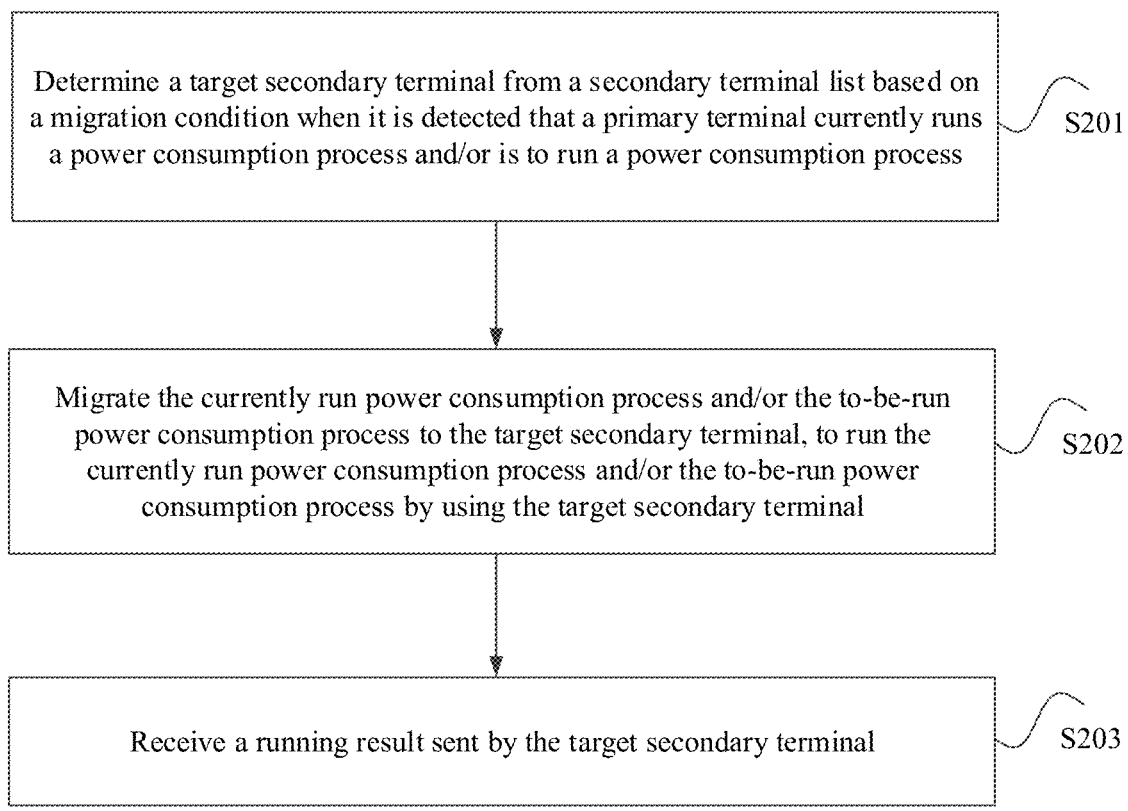
FIG. 2 is a schematic flowchart of a terminal power saving method according to an embodiment of this application.

For example, FIG. 2 is a schematic flowchart of a terminal power saving method according to an embodiment of this application. The terminal power saving method may be applied to a primary terminal. The primary terminal is powered by a battery, the primary terminal and at least one secondary terminal are in the same network, and the primary terminal and the secondary terminal are mutually trusted devices. The terminal power saving method may include the following steps.

S201: Determine a target secondary terminal from a secondary terminal list based on a migration condition when it is detected that the primary terminal currently runs a power consuming process and/or is to run a power consuming process.

It may be understood that the secondary terminal list includes at least one secondary terminal.

For example, the migration condition may include at least one of the following: a first-type migration condition: a power supply supplies power, there is no user operation, and the available resources of a secondary terminal are greater than a resource requirement of the currently running power consuming process and/or the to-be-run power consuming process; a second-type migration condition: a power supply supplies power, there is a user operation, and the available resources of a secondary terminal are greater than or equal to X times the resource requirements of the currently running power consuming process and/or the to-be-run power consuming process; a third-type migration condition: a power supply supplies power, a time for which there has been no user operation exceeds a preset time period, and the current time falls within a preset time period of a system; and a fourth-type migration condition: a battery supplies power, available power of the battery is greater than Y times the power requirements of the currently running power consuming process and/or the to-be-run power consuming process, there is no user operation, and available resources of a secondary terminal are greater than or equal to Z times the resource requirements of the currently running power consuming process and/or the to-be-run power consuming process, where all of X, Y, and Z are greater than or equal to 1. The priorities of the migration conditions sequentially decrease in the order of the first-type migration condition, the second-type migration condition, the third-type migration condition, and the fourth-type migration condition. Whether there is a user operation may be understood as a consideration of a secondary terminal resource. Certainly, in this embodiment of this application, an example in which the migration condition may include the five types of migration conditions is merely used for description, and the migration condition may be specifically set as actually required. For example, the preset time period in the third migration condition may be 30 minutes, and the preset time period of the system within which the current time falls may be 0:00 to 06:00 a.m., to indicate that there is currently no user operation on the secondary terminal.

It should be noted that a migration condition with a higher priority indicates a higher priority of selecting a secondary terminal that meets the migration condition. In other words, the secondary terminal that meets the migration condition is more conducive to the migration of the currently running power consuming process and/or the to-be-run power consuming process of the primary terminal, in other words, a probability of successfully running the currently running power consuming process and/or the to-be-run power consuming process of the primary terminal after the migration is larger.

It can be learned that, in the foregoing four types of migration conditions, each migration condition includes two considerations, one consideration is the current available power status of the secondary terminal, and the other consideration is the available resource status of the secondary terminal. For the first consideration, when it is determined whether the current available power status of the secondary terminal meets a requirement, the following cases exist. In one case, the current available power of the secondary terminal is relatively large, and is sufficient to meet a power requirement of the currently running power consuming process and/or the to-be-run power consuming process of the primary terminal. In this case, regardless of whether the secondary terminal is powered by a battery or a power supply, it is considered that the current available power of the secondary terminal meets the power requirement of the currently running power consuming process and/or the to-be-run power consuming process. In one case, although the current available power of the secondary terminal is relatively small, and the current remaining power is insufficient to meet a power requirement of the currently running power consuming process and/or the to-be-run power consuming process of the primary terminal, the secondary terminal is powered by a power supply. In this case, it may also be considered that the current available power of the secondary terminal meets the power requirement of the currently running power consuming process and/or the to-be-run power consuming process.

For the second consideration, when it is determined whether the current available resource status of the secondary terminal meets a requirement, current available resources of the secondary terminal may include at least three types of resources. The three types of resources are CPU resources, GPU resources, and DDR resources. Certainly, other resources may also be included. In this embodiment of this application, the three types of resources are merely used as an example for description, but it does not indicate that this embodiment of this application is limited thereto. For example, the current available CPU resources of the secondary terminal may be represented by SC, the current available GPU resources of the secondary terminal may be represented by SG, and the current available DDR resources of the secondary terminal may be represented by SD. When the current available resource status of the secondary terminal is indicated by using the three types of resources, to determine that the current available resources of the secondary terminal meet the resource requirement of the currently running power consuming process and/or the to-be-run power consuming process, correspondingly, a status of resources required by the currently running power consuming process and/or the to-be-run power consuming process also needs to be obtained. Certainly, the resources required by the currently running power consuming process and/or the to-be-run power consuming process may also be represented by the three types of resources, namely, CPU resources required by the currently running power consuming process and/or the to-be-run power consuming process, GPU resources required by the currently running power consuming process and/or the to-be-run power consuming process, and DDR resources required by the currently running power consuming process and/or the to-be-run power consuming process. For example, the CPU resources required by the currently running power consuming process and/or the to-be-run power consuming process may be represented by Cx, the GPU resources required by the currently running power consuming process and/or the to-be-run power consuming process may be represented by Gx, and the DDR resources required by the currently running power consuming process and/or the to-be-run power consuming process may be represented by Dx. After the three types of available resources of the secondary terminal and the three types of resources required by the currently running power consuming process and/or the to-be-run power consuming process of the primary terminal are separately obtained, the available resources of the secondary terminal may be compared with the resources required by the currently running power consuming process and/or the to-be-run power consuming process of the primary terminal, to determine whether the current available resources of the secondary terminal meet the resource requirement of the currently running power consuming process and/or the to-be-run power consuming process.

It may be understood that when the available resources of the secondary terminal include the three types of resources: the available CPU resources, the available GPU resources, and the available DDR resources, the first-type migration condition may be changed into the following: a power supply supplies power, there is no user operation, and SC is greater than or equal to Cx; the second-type migration condition may be changed into the following: a power supply supplies power, there is a user operation, SC is greater than or equal to X*Cx, SG is greater than or equal to X*Gx, and SD is greater than or equal to X*Dx; the third-type migration condition is still as follows: a power supply supplies power, a time for which there has been no user operation exceeds a preset time period, and the current system time falls within a second preset time period of a system; and the fourth-type migration condition may be extended to at least two different migration conditions. The first migration condition is: a battery supplies power, available power of the battery is greater than Y times the power requirements of the currently running power consuming process and/or the to-be-run power consuming process, there is no user operation, and SC is greater than or equal to Z*Cx. The second migration condition is: a battery supplies power, available power of the battery is greater than Y times the power requirements of the currently running power consuming process and/or the to-be-run power consuming process, there is no user operation, SC is greater than or equal to Y*Cx, SG is greater than or equal to Y*Gx, and SD is greater than or equal to Y*Dx. All of X, Y, and Z are greater than or equal to 1. For example, in this embodiment of this application, for the two different migration conditions extended from the fourth-type migration condition, the priority of the first migration condition is higher than the priority of the second migration condition.

It should be noted that, when it is determined, by using the four types of migration conditions, whether the current available power of the secondary terminal meets the power requirement of the currently running power consuming process and/or the to-be-run power consuming process, and whether the current available resources of the secondary terminal meet the resource requirement of the currently running power consuming process and/or the to-be-run power consuming process, when a key component corresponding to the primary terminal is equivalent to a key component corresponding to the secondary terminal, for example, the primary terminal is a mobile phone and the secondary terminal is also a mobile phone, systems on chip (system on chip, SOC) corresponding to the primary terminal and the secondary terminal belong to the same model. After the current available power and the current available resources of the secondary terminal and the power requirement and the resource requirement of the currently running power consuming process and/or the to-be-run power consuming process of the primary terminal are separately obtained, the current available power and the current available resources of the secondary terminal may be separately compared with power and the resources required by the currently running power consuming process and/or the to-be-run power consuming process of the primary terminal, where the current available power and the current available resources of the secondary terminal are current target power and current target resources of the terminal, to determine whether the current target power of the secondary terminal meets the power requirement of the currently running power consuming process and/or the to-be-run power consuming process and whether the current target resources of the secondary terminal meet the resource requirement of the currently running power consuming process and/or the to-be-run power consuming process.

On the contrary, when a key component corresponding to the primary terminal is not equivalent to a key component corresponding to the secondary terminal, for example, the primary terminal is a mobile phone, and the secondary terminal is a watch, SOCs corresponding to the primary terminal named the mobile phone and the secondary terminal named the watch do not belong to a same model. Therefore, to ensure that the secondary terminal can successfully run the currently running power consuming process and/or the to-be-run power consuming process of the primary terminal, after the current available power and the current available resources of the secondary terminal and the power requirement and the resource requirement of the currently running power consuming process and/or the to-be-run power consuming process of the primary terminal are separately obtained, normalization processing needs to be performed on the power requirement and the resource requirement of the currently running power consuming process and/or the to-be-run power consuming process of the primary terminal and/or the current available power and the current available resources of the secondary terminal. In an example in which normalization processing is performed on the current available power and the current available resources of the secondary terminal, the current target power and current target resources of the secondary terminal may be obtained, and then the current target power and the current target resources of the secondary terminal are separately compared with power and the resources required by the currently running power consuming process and/or the to-be-run power consuming process of the primary terminal, to determine whether the current target power of the secondary terminal meets the power requirement of the currently running power consuming process and/or the to-be-run power consuming process and whether the current target resources of the secondary terminal meet the resource requirement of the currently running power consuming process and/or the to-be-run power consuming process.

For example, in this embodiment of this application, to enable the key component corresponding to the primary terminal to be equivalent to the key component corresponding to the secondary terminal, normalization processing may be performed in three manners. In one manner, normalization processing may be performed, by using a common performance measurement method in the industry as a basis, on the current available power and the current available resources of the secondary terminal and the power and the resources required by the currently running power consuming process and/or the to-be-run power consuming process of the primary terminal, so that the key component corresponding to the primary terminal is equivalent to the key component of the secondary terminal, thereby improving a probability that the secondary terminal can successfully run the currently running power consuming process and/or the to-be-run power consuming process of the primary terminal. For example, in this possible manner, when normalization processing is performed on the current available power SP of the secondary terminal, current available power SP of the secondary terminal=SP*battery capacity of the secondary terminal. The secondary terminal is a device powered by a battery. When normalization processing is performed on the current available CPU resources, the current available GPU resources, and the current available DDR resources of the secondary terminal, current available CPU resources SC of the secondary terminal=SC/highest clock speed of a CPU of the secondary terminal/Dhrystone benchmark of the highest frequency, current available GPU resources SG of the secondary terminal=SG/highest clock speed of a GPU of the secondary terminal*Manhattan 3.0 benchmark of the highest frequency, and current available DDR resources SD of the secondary terminal=SD*highest clock speed of a DDR of the primary terminal. When normalization processing is performed on the power Px required by the currently running power consuming process and/or the to-be-run power consuming process of the primary terminal, power Px required by the currently running power consuming process and/or the to-be-run power consuming process of the primary terminal=Px*battery capacity of the primary terminal. When normalization processing is performed on the CPU resources required by the currently running power consuming process and/or the to-be-run power consuming process of the primary terminal, the GPU resources required by the currently running power consuming process and/or the to-be-run power consuming process of the primary terminal, and the DDR resources of the currently running power consuming process and/or the to-be-run power consuming process of the primary terminal, required CPU resources Cx=Cx/highest clock speed of a CPU of the primary terminal*Dhrystone benchmark of the highest frequency, required GPU resources Gx=Gx/highest clock speed of a GPU of the primary terminal*Manhattan 3.0 benchmark of the highest frequency, and required DDR resources Dx=Dx*highest clock speed of a DDR of the primary terminal. In this case, SC and Cx, SG and Gx, SD and Dx, and SP and Px can be compared by using the same horizontal reference. In another manner, normalization processing may be separately performed, by using a device capability of the secondary terminal as a reference, on the power and the resources required by the currently running power consuming process and/or the to-be-run power consuming process of the primary terminal. In still another manner, normalization processing may be separately performed on the current available power and the current available resources of the secondary terminal by using a device capability of the primary terminal as a reference. Certainly, in this embodiment of this application, the three manners are merely used as examples for description, but it does not indicate that this embodiment of this application is limited thereto.

It should be noted that, in this embodiment of this application, an example in which normalization processing is performed, by using the common performance measurement method in the industry as a basis, on the current available power and the current available resources of the secondary terminal and the power and the resources required by the currently running power consuming process and/or the to-be-run power consuming process of the primary terminal is merely used for description, but it does not indicate that this embodiment of this application is limited thereto. It can be learned that before normalization processing is performed on the power and the resources required by the currently running power consuming process and/or the to-be-run power consuming process of the primary terminal, the power and the resources required by the currently running power consuming process and/or the to-be-run power consuming process of the primary terminal need to be separately obtained, and then normalization processing can be separately performed on the current available power and the available resources of the secondary terminal. For example, when the power required by the currently running power consuming process and/or the to-be-run power consuming process of the primary terminal is obtained, corresponding power consumption of running the currently running power consuming process and/or the to-be-run power consuming process in each day of the previous week may be obtained in advance to obtain seven power consumption values, a hundreds-place rounding is performed on each of the seven power consumption values to obtain seven power consumption values obtained after the hundreds-place rounding, and then a mathematical expected value of the seven power consumption values obtained after the hundreds-place rounding is calculated. The final mathematical expected value may be used as a predicted power value Px required by the currently running power consuming process and/or the to-be-run power consuming process of the primary terminal. Similarly, a manner of obtaining the CPU resources, the GPU resources, and the DDR resources required by the currently running power consuming process and/or the to-be-run power consuming process of the primary terminal is similar to the manner of obtaining the power required by the currently running power consuming process and/or the to-be-run power consuming process of the primary terminal. Herein, details are not described again in this embodiment of this application.

Based on the foregoing descriptions, after the migration condition is fully understood, the target secondary terminal may be determined from the secondary terminal list based on the migration condition when it is detected that the primary terminal currently runs a power consuming process and/or is to run a power consuming process. Optionally, in this embodiment of this application, the target secondary terminal may be determined, by using the following at least two possible implementations, from the secondary terminal list based on the migration condition when it is detected that the primary terminal currently runs a power consuming process and/or is to run a power consuming process.

In a possible implementation, when it is detected that the primary terminal currently runs a power consuming process and/or is to run a power consuming process, starting from the first secondary terminal in the secondary terminal list, the current target power and current target resources of the secondary terminal are obtained; it is determined whether the current target power and the current target resources of the secondary terminal meet the migration condition until a secondary terminal that meets the migration condition is determined; and the secondary terminal that meets the migration condition is determined as the target secondary terminal.

In this possible implementation, when the target secondary terminal is determined from the secondary terminal list based on the migration condition, determining may be performed based on an existing order in the secondary terminal list. In an example in which the secondary terminal list sequentially includes a first secondary terminal, a second secondary terminal, a third secondary terminal, and a fourth secondary terminal, the current target power and current target resources of the first secondary terminal in the existing order are first obtained, and it is determined whether the current target power and the current target resources of the first secondary terminal meet any one of the foregoing four types of migration conditions. If the current target power and the current target resources of the first secondary terminal meet none of the four types of migration conditions, the current target power and current target resources of the second secondary terminal in the existing order are further obtained, and it is determined whether the current target power and the current target resources of the second secondary terminal meet any one of the four types of migration conditions. If the current target power and the current target available resources of the second secondary terminal meet one of the four types of migration conditions, to reduce the amount of data processing and improve process running efficiency, the second secondary terminal may be directly determined as the target secondary terminal without the need to obtain the current target power and current target resources of the third secondary terminal in the existing order for comparison. Certainly, when the target secondary terminal is determined from the secondary terminal list based on the migration condition, determining may not be performed based on an existing order in the secondary terminal list, but the current target power and current target resources of a secondary terminal in the secondary terminal list are randomly obtained. For example, if the secondary terminal is a second secondary terminal, the current target power and current target resources of the second secondary terminal are obtained, and it is determined whether the current target power and the current target resources of the second secondary terminal meet any one of the four types of migration conditions. If the current target power and the current target resources of the second secondary terminal meet none of the four types of migration conditions, the current target power and current target resources of another secondary terminal in the secondary terminal list are further randomly obtained. For example, if the another secondary terminal is a fourth secondary terminal, current target power and current target resources of the fourth secondary terminal are obtained, and it is determined whether the current target power and the current target resources of the fourth secondary terminal meet any one of the four types of migration conditions. If the current target power and the current target available resources of the fourth secondary terminal meet one of the four types of migration conditions, to reduce the amount of data processing and improve process running efficiency, the fourth secondary terminal may be directly determined as the target secondary terminal without the need to randomly obtain the current target power and current target resources of another secondary terminal for comparison. Details may be set as actually required. In this embodiment of this application, the two manners are merely used as examples for description, but it does not indicate that this embodiment of this application is limited thereto.

It can be learned that, when the target secondary terminal is determined from the secondary terminal list based on the migration condition, in this possible implementation, provided that it is determined that one secondary terminal in the secondary terminal list meets the migration condition, the secondary terminal that currently meets the migration condition may be determined as the target secondary terminal without a need to determine whether current target power and current target resources that correspond to each secondary terminal in the secondary terminal list meet the migration condition, so that the amount of data processing is reduced, and process running efficiency is improved.

In a possible implementation, when it is detected that the primary terminal currently runs a power consuming process and/or is to run a power consuming process, the current target power and current target resources that correspond to each of all secondary terminals in the secondary terminal list are separately obtained; it is determined whether the current target power and the current target resources that correspond to each of all the secondary terminals in the secondary terminal list meet the migration condition; and the target secondary terminal is determined from all secondary terminals that meet the migration condition.

Optionally, when the target secondary terminal is determined from all the secondary terminals that meet the migration condition, a migration condition type corresponding to each of all the secondary terminals that meet the migration condition may be first determined; and a secondary terminal corresponding to a migration condition type with the highest priority is determined as the target secondary terminal.

In this possible implementation, in an example in which the secondary terminal list includes a first secondary terminal, a second secondary terminal, a third secondary terminal, and a fourth secondary terminal, the current target power and current target resources that correspond to each of the first secondary terminal, the second secondary terminal, the third secondary terminal, and the fourth secondary terminal need to be separately obtained, and it is determined whether the current target power and the current target resources that correspond to each of the first secondary terminal, the second secondary terminal, the third secondary terminal, and the fourth secondary terminal meet the migration condition. If it is determined that the first secondary terminal meets the first-type migration condition, the second secondary terminal meets none of the four types of migration conditions, the third secondary terminal meets the third-type migration condition, and the fourth secondary terminal meets the fourth-type migration condition, it can be learned that secondary terminals that meet the migration condition are the first secondary terminal, the third secondary terminal, and the fourth secondary terminal. Further, priorities of the first-type migration condition met by the first secondary terminal, the third-type migration condition met by the third secondary terminal, and the fourth-type migration condition met by the fourth secondary terminal may be compared. Because the priority of the first-type migration condition is higher than the priorities of the third-type migration condition and the fourth-type migration condition, the first secondary terminal corresponding to the first-type migration condition with the highest priority may be determined as the target secondary terminal, so that the first secondary terminal is more conducive to the migration of the currently running power consuming process and the to-be-run power consuming process of the primary terminal, in other words, the probability of successfully running the currently running power consuming process and/or the to-be-run power consuming process of the primary terminal on the first secondary terminal after the migration is larger, thereby further improving the process migration success rate. Certainly, after it is determined that the first secondary terminal meets the first-type migration condition, the second secondary terminal meets none of the four-type migration conditions, the third secondary terminal meets the third-type migration condition, and the fourth secondary terminal meets the fourth-type migration condition, any one of the first secondary terminal, the third secondary terminal, and the fourth secondary terminal that meet the migration condition may be directly selected as the target secondary terminal without the need to further determine the priorities of the first-type migration condition met by the first secondary terminal, the third-type migration condition met by the third secondary terminal, and the fourth-type migration condition met by the fourth secondary terminal. In this embodiment of this application, an example in which the priorities of the first-type migration condition met by the first secondary terminal, the third-type migration condition met by the third secondary terminal, and the fourth-type migration condition met by the fourth secondary terminal are further determined is merely used as an example for description, but it does not indicate that this embodiment of this application is limited thereto.

It can be learned that this possible implementation differs from the foregoing first possible implementation in that, in this possible implementation, it needs to be determined whether the current target power and the current target resources that correspond to each secondary terminal in the secondary terminal list meet the migration condition, and the secondary terminal corresponding to the migration condition type with the highest priority needs to be determined as the target secondary terminal. Although this possible implementation is compared with the foregoing first possible implementation, because the secondary terminal corresponding to the migration condition type with the highest priority is determined as the target secondary terminal in this possible implementation, so that the target secondary terminal is more conducive to the migration of the currently running power consuming process and/or the to-be-run power consuming process of the primary terminal, in other words, a probability of successfully running the currently running power consuming process and/or the to-be-run power consuming process of the primary terminal on the target secondary terminal after the migration is larger, thereby further improving the process migration success rate.

After the target secondary terminal is determined from the secondary terminal list based on the migration condition in S201 when it is detected that the primary terminal currently runs a power consuming process and/or is to run a power consuming process, the currently running power consuming process and/or the to-be-run power consuming process may be migrated to the target secondary terminal, so that the currently running power consuming process and/or the to-be-run power consuming process are or is run by using the target secondary terminal, that is, S202 is performed.

S202: Migrate the currently running power consuming process and/or the to-be-run power consuming process to the target secondary terminal, to run the currently running power consuming process and/or the to-be-run power consuming process by using the target secondary terminal.

After receiving the currently running power consuming process and/or the to-be-run power consuming process of the primary terminal, the target secondary terminal may run the currently running power consuming process and/or the to-be-run power consuming process of the primary terminal to obtain a running result, and send running to the primary terminal, so that the primary terminal displays or outputs the running result of the currently running power consuming process and/or the to-be-run power consuming process of the primary terminal to a user.

S203: Receive the running result sent by the target secondary terminal.

It should be noted that, in an entire process migration process, although a process running delay is increased, the user is unaware of the entire migration process.

It can be learned that, in this embodiment of this application, the primary terminal may determine the target secondary terminal from the at least one secondary terminal when detecting that the primary terminal currently runs a power consuming process and/or is to run a power consuming process, and migrate the currently running power consuming process and/or the to-be-run power consuming process to the target secondary terminal, to run the currently running power consuming process and/or the to-be-run power consuming process by using the target secondary terminal. In this way, the primary terminal only needs to receive the running result sent by the target secondary terminal, without running the currently running power consuming process and/or the to-be-run power consuming process, so that power consumption of the primary terminal that is caused by running the currently running power consuming process and/or the to-be-run power consuming process is avoided, and power of the primary terminal is saved, thereby improving the battery life of the terminal without affecting its programs from running.

Figure 3:
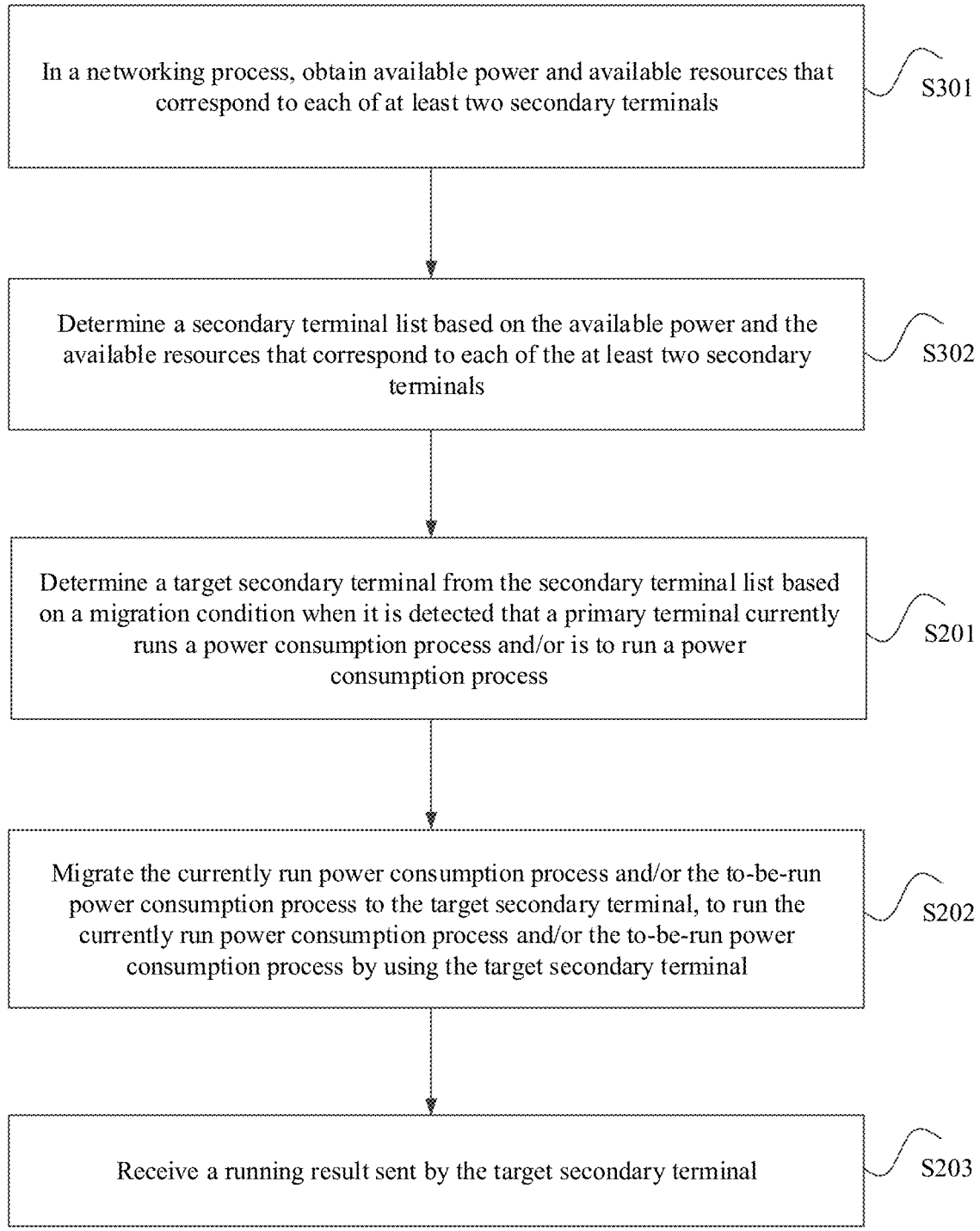
FIG. 3 is a schematic flowchart of another terminal power saving method according to an embodiment of this application.

Based on the foregoing embodiment shown in FIG. 2, it can be learned the secondary terminal list needs to be first obtained before the target secondary terminal is determined from the secondary terminal list based on the migration condition in S201 when it is detected that the primary terminal currently runs a power consuming process and/or is to run a power consuming process. The secondary terminal list includes at least one secondary terminal. For example, the secondary terminal list may be determined from at least two secondary terminals in a networking process of the primary terminal and at least one secondary terminal. FIG. 3 is a schematic flowchart of another terminal power saving method according to an embodiment of this application. The terminal power saving method may further include the following steps.

S301: In a networking process, obtain the available power and available resources that correspond to each of at least two secondary terminals.

For example, in the networking process, when obtaining the available power and the available resources that correspond to each of the at least two secondary terminals, a primary terminal may actively obtain the available power and the available resources that correspond to each of the at least two secondary terminals, or passively receive the available power and the available resources that correspond to each of the at least two secondary terminals. Details may be set as actually required. Herein, a manner of obtaining the available power and the available resources that correspond to each of the at least two secondary terminals is not further limited in this embodiment of this application.

After the available power and the available resources that correspond to each of the at least two secondary terminals are obtained, it may be determined whether the available power and the available resources that correspond to each of the at least two secondary terminals meet a preset condition, to determine a secondary terminal list, that is, perform S302.

S302: Determine the secondary terminal list based on the available power and the available resources that correspond to each of the at least two secondary terminals.

A secondary terminal in the secondary terminal list meets the preset condition. For example, the preset condition is different from the foregoing migration condition, and the preset condition has a smaller limitation degree than the migration condition. For example, the preset condition may include: power is greater than 20%, charging is performed by using a power supply, and the available resources are greater than a threshold. On the contrary, if the power of a secondary terminal is less than 20%, and the secondary terminal is charged by using a battery, or key components of the primary terminal and the secondary terminal are completely different, for example, when the primary terminal is a mobile phone, the secondary terminal is a watch, and two SOCs are not at one level at all, it is considered that the secondary terminal does not meet the preset condition. Certainly, the secondary terminal list does not include the secondary terminal, either.

It may be understood that, in this embodiment of this application, in the networking process, the secondary terminal list is determined based on the available power and the available resources that correspond to each of the at least two secondary terminals, for the purpose of performing preliminary screening on selection of the target secondary terminal. It cannot be ensured that a secondary terminal that currently meets the preset condition can also meet the migration condition when the terminal subsequently detects that the primary terminal currently runs a power consuming process and/or is to run a power consuming process. Therefore, the target secondary terminal still needs to be determined from the secondary terminal list based on the migration condition during determining of the target secondary terminal when the terminal subsequently detects that the primary terminal currently runs a power consuming process and/or is to run a power consuming process. It can be learned that the preliminary screening can reduce the amount of data processing for subsequently determining the target secondary terminal from the secondary terminal list based on the migration condition, to improve process migration efficiency.

It should be noted that, when it is determined whether the available power and the available resources that correspond to each of the at least two secondary terminals meet the preset condition, to determine the secondary terminal list, the available power and the available resources that correspond to each of the at least two secondary terminals may be directly compared with the preset condition, to determine the secondary terminal list, or certainly, normalization processing may be first performed on the available power and the available resources that correspond to each of the at least two secondary terminals, and then it may be determined whether available power and available resources that correspond to each of the at least two secondary terminals and that are obtained after the normalization processing meet the preset condition, to determine the secondary terminal list. Details may be set as actually required. Herein, no further limitation is set in this embodiment of this application.

For ease of understanding of the foregoing technical solutions provided in the embodiments of this application, the following describes, with reference to two specific scenarios, the technical solutions provided in the embodiments of this application. In one possible scenario, a primary terminal is a mobile phone, a first secondary terminal is a smart television box, and a second secondary terminal is a smart speaker. Available power of the primary terminal is less than 20%, both the first secondary terminal and the second secondary terminal are powered by power supplies, and neither the first secondary terminal nor the second secondary terminal is currently used by a user. When a user runs a game through clicking, it may be predicted, based on statistics, that power consumption required for running the game is P1, and P1≥800 mAh. In this case, if the primary terminal needs to migrate the currently running game to a target secondary terminal for running, the primary terminal needs to select the target secondary terminal from the first secondary terminal and the second secondary terminal based on a migration condition. If the primary terminal determines that the second secondary terminal named the smart speaker is determined as the target secondary terminal, the primary terminal migrates the game to the second secondary terminal named the smart speaker, to run the game by using the smart speaker, and receives a running result sent by the smart speaker. In the entire process, the primary terminal only receives and displays the running result, and hands over a large quantity of running and computation tasks to the smart speaker for execution. Therefore, the primary terminal can run the game two more hours compared with no migration. It can be learned that the primary terminal migrates the currently to-be-run game process to the smart speaker, to run the game process by using the smart speaker. In this way, the primary terminal only needs to receive the running result sent by the smart speaker, without running the game process, so that power consumption of the primary terminal that is caused by running the game process is avoided, and power of the primary terminal is saved, thereby improving the battery life of the terminal without affecting its programs from running.

It should be noted that, through the migration operation, although a game process running delay is increased, the user is unaware of the entire migration process.

In the other possible scenario, similarly, a primary terminal is a mobile phone, a first secondary terminal is a smart television box, and a second secondary terminal is a smart speaker. Available power of the primary terminal is less than 20%, both the first secondary terminal and the second secondary terminal are powered by power supplies, and neither the first secondary terminal nor the second secondary terminal is currently used by a user. In this case, if current time is 01:00, in other words, it is at night, a user opens a plurality of instant messaging (IM) applications on the primary terminal, enables a Wi-Fi option or a data connection service, and controls the primary terminal to be in a screen-off standby state, and it is found through statistics collection that average night power consumption of the primary terminal in the standby state exceeds 5%, although the primary terminal is in the screen-off standby state, the primary terminal can still receive an instant messaging message sent by another device. To reduce the power consumption of the primary terminal, the primary terminal may select a target secondary terminal from the first secondary terminal and the second secondary terminal based on a migration condition. If the primary terminal determines that the second secondary terminal named the smart speaker is determined as the target secondary terminal, the primary terminal may migrate at least one of the plurality of opened instant messaging applications to the second secondary terminal named the smart speaker, to run the at least one instant messaging application by using the smart speaker, and receive a running result sent by the smart speaker. Certainly, migrating all of the plurality of opened instant messaging applications from the primary terminal to the second secondary terminal named the smart speaker saves most power, that is, causes the least power consumption of the primary terminal. In the entire process, the primary terminal only needs to receive the running result sent by the smart speaker, without running a process of the at least one instant messaging application, so that power consumption of the primary terminal that is caused by running the process of the at least one instant messaging application is avoided, and power of the primary terminal is saved, thereby improving the battery life of the terminal without affecting its programs from running.

In this scenario, the primary terminal only needs to receive the running result sent by the smart speaker, but the primary terminal may receive a message of the at least one instant messaging application when the process of the at least one instant messaging application is run. The message may include a valid message or may be a spam message. Therefore, to avoid power consumption of the primary terminal that is caused by receiving a spam message, the smart speaker may further filter received messages. If the smart speaker determines that a message is a valid message, the smart speaker sends the valid efficiency to the primary terminal. On the contrary, if a message is a spam message, the smart speaker does not send the spam message to the primary terminal, so that power consumption caused by receiving a spam message can be avoided, and power of the primary terminal is further saved, thereby improving the battery life of the terminal without affecting its programs from running.

Figure 4:
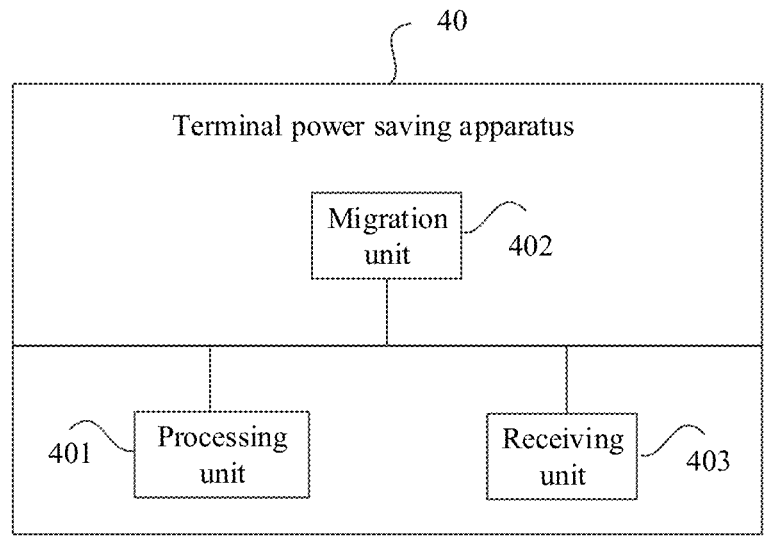
FIG. 4 is a schematic diagram of a structure of a terminal power saving apparatus according to an embodiment of this application.

FIG. 4 is a schematic diagram of a structure of a terminal power saving apparatus 40 according to an embodiment of this application. The terminal power saving apparatus 40 is applied to a primary terminal. The primary terminal is powered by a battery, and the primary terminal and at least one secondary terminal are in a same network. For example, as shown in FIG. 4, the terminal power saving apparatus 40 may include:

a processing unit 401, configured to determine a target secondary terminal from the at least one secondary terminal when it is detected that the primary terminal currently runs a power consuming process and/or is to run a power consuming process;

a migration unit 402, configured to migrate the currently running power consuming process and/or the to-be-run power consuming process to the target secondary terminal, to run the currently running power consuming process and/or the to-be-run power consuming process by using the target secondary terminal; and a receiving unit 403, configured to receive a running result sent by the target secondary terminal.

Optionally, there are at least two secondary terminals, and the processing unit 401 is specifically configured to: determine a secondary terminal list from the at least two secondary terminals in a networking process, where the secondary terminal list includes at least one secondary terminal; and determine the target secondary terminal from the secondary terminal list based on a migration condition when it is detected that the primary terminal currently runs a power consuming process and/or is to run a power consuming process, where the migration condition includes: available power meets a power requirement of the currently running power consuming process and/or the to-be-run power consuming process, and available resources meet a resource requirement of the currently running power consuming process and/or the to-be-run power consuming process.

Optionally, the migration condition includes at least one of the following: a first-type migration condition: a power supply supplies power, there is no user operation, and available resources of a secondary terminal are greater than the resource requirement of the currently running power consuming process and/or the to-be-run power consuming process; a second-type migration condition: a power supply supplies power, there is a user operation, and available resources of a secondary terminal are greater than or equal to X times the resource requirements of the currently running power consuming process and/or the to-be-run power consuming process; a third-type migration condition: a power supply supplies power, a time for which there has been no user operation exceeds a preset time period, and current time falls within a preset time period of a system; and a fourth-type migration condition: a battery supplies power, available power of the battery is greater than Y times the power requirements of the currently running power consuming process and/or the to-be-run power consuming process, there is no user operation, and available resources of a secondary terminal are greater than or equal to Z times the resource requirements of the currently running power consuming process and/or the to-be-run power consuming process, where all of X, Y, and Z are greater than or equal to 1; where the priorities of the migration conditions sequentially decrease in the order of the first-type migration condition, the second-type migration condition, the third-type migration condition, and the fourth-type migration condition.

Optionally, the processing unit 401 is specifically configured to: when it is detected that the primary terminal currently runs a power consuming process and/or is to run a power consuming process, starting from the first secondary terminal in the secondary terminal list, obtain current target power and current target resources of the secondary terminal; determine whether the current target power and the current target resources of the secondary terminal meet the migration condition until a secondary terminal that meets the migration condition is determined; and determine the secondary terminal that meets the migration condition as the target secondary terminal.

Optionally, the processing unit 401 is specifically configured to: when it is detected that the primary terminal currently runs a power consuming process and/or is to run a power consuming process, separately obtain the current target power and current target resources that correspond to each of all secondary terminals in the secondary terminal list; determine whether the current target power and the current target resources that correspond to each of all the secondary terminals in the secondary terminal list meet the migration condition; and determine the target secondary terminal from all secondary terminals that meet the migration condition.

Optionally, the processing unit 401 is specifically configured to: determine a migration condition type corresponding to each of all the secondary terminals that meet the migration condition; and determine, as the target secondary terminal, a secondary terminal corresponding to a migration condition type with the highest priority.

Optionally, the processing unit 401 is specifically configured to: obtain current available power and current available resources that correspond to the secondary terminal; and separately perform normalization processing on the current available power and the current available resources that correspond to the secondary terminal, to obtain the current target power and the current target resources that correspond to the secondary terminal.

Optionally, the processing unit 401 is specifically configured to: in the networking process, obtain available power and available resources that correspond to each of the at least two secondary terminals; and determine the secondary terminal list based on the available power and the available resources that correspond to each of the at least two secondary terminals, where a secondary terminal in the secondary terminal list meets a preset condition.

It may be understood that the terminal power saving apparatus 40 in the embodiment shown in FIG. 4 may be the terminal, or may be a component (for example, a chip or a circuit) that may be configured in the terminal.

The terminal power saving apparatus 40 shown in this embodiment of this application may execute the technical solution of the terminal power saving method shown in any one of the foregoing embodiments. An implementation principle and a beneficial effect of the terminal power saving apparatus 40 are similar to an implementation principle and a beneficial effect of the terminal power saving method, and are not described herein again.

Figure 5:
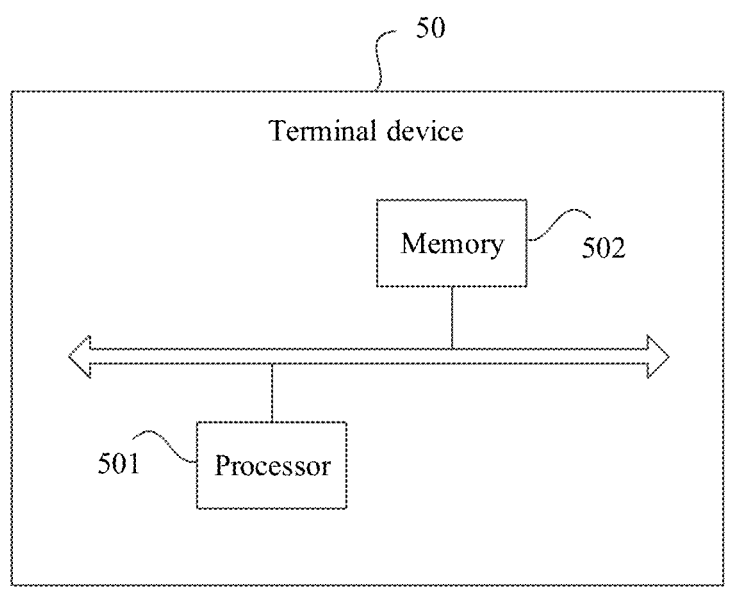
FIG. 5 is a schematic diagram of a structure of a terminal device according to an embodiment of this application.

FIG. 5 is a schematic diagram of a structure of a terminal device 50 according to an embodiment of this application. The terminal device 50 may include a processor 501 and a memory 502.

The memory 502 is configured to store program instructions.

The processor 501 is configured to execute the program instructions in the memory 502, so that the terminal device 50 executes the technical solution of the terminal power saving method shown in any one of the foregoing embodiments. An implementation principle and a beneficial effect of the terminal device 50 are similar to an implementation principle and a beneficial effect of the terminal power saving method, and are not described herein again.

An embodiment of this application further provides a computer storage medium, including instructions. When the instructions are run by one or more processors, a terminal device executes the technical solution of the terminal power saving method shown in any one of the foregoing embodiments. An implementation principle and a beneficial effect of the computer storage medium are similar to an implementation principle and a beneficial effect of the terminal power saving method, and are not described herein again.

An embodiment of this application further provides a chip. The chip stores a computer program, and the computer program is executed by a processor to execute the technical solution of the terminal power saving method shown in any one of the foregoing embodiments. An implementation principle and a beneficial effect of the chip are similar to an implementation principle and a beneficial effect of the terminal power saving method, and are not described herein again.

The processor in the foregoing embodiments may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory (RAM), a flash memory, a read-only memory (ROM), a programmable read-only memory, an electrically erasable programmable memory, a register, or the like. The storage medium is located in the memory, and the processor reads instructions in the memory and completes the steps in the foregoing methods in combination with hardware of the processor.

In the several embodiments provided in this application, it should be understood that the disclosed apparatuses and methods may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, and may be located in one position, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of hardware and a software functional unit.

What is claimed is:

1. A terminal power saving method, applied to a primary terminal, wherein the primary terminal is powered by a battery, the primary terminal and at least two secondary terminals are in a same network, and the method comprises:

selecting a target secondary terminal from the at least two secondary terminals when it is detected that the primary terminal currently runs a power consuming process or is to run a power consuming process;

migrating the currently running power consuming process or the to-be-run power consuming process to the target secondary terminal, to run the currently running power consuming process or the to-be-run power consuming process by using the target secondary terminal; and receiving a running result sent by the target secondary terminal;

wherein the selecting of a target secondary terminal from the at least two secondary terminals when it is detected that the primary terminal currently runs a power consuming process or is to run a power consuming process comprises:

determining a secondary terminal list from the at least two secondary terminals in a networking process, wherein the secondary terminal list comprises at least one secondary terminal; and selecting the target secondary terminal from the secondary terminal list based on a migration condition when it is detected that the primary terminal currently runs a power consuming process or is to run a power consuming process, wherein the migration condition comprises: available power meets a power requirement of the currently running power consuming process or the to-be-run power consuming process, and available resources meet a resource requirement of the currently running power consuming process or the to-be-run power consuming process, wherein the migration condition comprises at least one of the following:

a first-type migration condition that comprises: a power supply supplies power, there is no user operation, and available resources of a secondary terminal are greater than the resource requirement of the currently running power consuming process or the to-be-run power consuming process;

a second-type migration condition that comprises: a power supply supplies power, there is a user operation, and available resources of a secondary terminal are greater than or equal to X resource requirements of the currently running power consuming process or the to-be-run power consuming process;

a third-type migration condition that comprises: a power supply supplies power, a time for which there has been no user operation exceeds a preset time period, and current time falls within a preset time period of a system; or a fourth-type migration condition that comprises: a battery supplies power, available power of the battery is greater than Y power requirements of the currently running power consuming process or the to-be-run power consuming process, there is no user operation, and available resources of a secondary terminal are greater than or equal to Z resource requirements of the currently running power consuming process or the to-be-run power consuming process, wherein all of X, Y, and Z are greater than or equal to 1; and wherein priorities of the migration conditions sequentially decrease based on a sequence of the first-type migration condition, the second-type migration condition, the third-type migration condition, and the fourth-type migration condition.

2. The method according to claim 1, wherein the selecting the target secondary terminal from the secondary terminal list based on a migration condition when it is detected that the primary terminal currently runs a power consuming process or is to run a power consuming process comprises:

when it is detected that the primary terminal currently runs a power consuming process or is to run a power consuming process, selecting a first secondary terminal in the secondary terminal list, obtaining current target power and current target resources of each secondary terminal on the secondary terminal list;

determining whether the current target power and the current target resources of the secondary terminal meet the migration condition until a secondary terminal that meets the migration condition is determined; and determining the secondary terminal that meets the migration condition as the target secondary terminal.

3. The method according to claim 2, wherein the obtaining a current target power and current target resources that correspond to the secondary terminal comprises:

obtaining a current available power and current available resources that correspond to the secondary terminal; and separately performing normalization processing on the current available power and the current available resources that correspond to the secondary terminal, to obtain the current target power and the current target resources that correspond to the secondary terminal.

4. The method according to claim 1, wherein the selecting the target secondary terminal from the secondary terminal list based on a migration condition when it is detected that the primary terminal currently runs a power consuming process or is to run a power consuming process comprises:

when it is detected that the primary terminal currently runs a power consuming process or is to run a power consuming process, separately obtaining a current target power and current target resources that correspond to each of secondary terminals in the secondary terminal list;

determining whether the current target power and the current target resources that correspond to each of the secondary terminals in the secondary terminal list meet the migration condition; and selecting the target secondary terminal from secondary terminals that meet the migration condition.

5. The method according to claim 4, wherein the selecting the target secondary terminal from the secondary terminals that meet the migration condition comprises:

determining a migration condition type corresponding to each of the secondary terminals that meet the migration condition; and determining, as the target secondary terminal, a secondary terminal corresponding to a migration condition type with a highest priority.

6. The method according to claim 1, wherein the determining a secondary terminal list from the at least two secondary terminals in a networking process comprises:

in the networking process, obtaining an available power and available resources that correspond to each of the at least two secondary terminals; and determining the secondary terminal list based on the available power and the available resources that correspond to each of the at least two secondary terminals, wherein a secondary terminal in the secondary terminal list meets a preset condition.

7. A terminal power saving apparatus, applied to a primary terminal, wherein the primary terminal is powered by a battery, the primary terminal and at least two secondary terminals are in a same network, and the apparatus comprises:
a processor,
a storage coupled to the processor, and
a memory coupled to the processor to store instructions, which when executed by the processor, cause the processor to perform the operations, the operations comprising:
selecting a target secondary terminal from the at least two secondary terminals when it is detected that the primary terminal currently runs a power consuming process or is to run a power consuming process;
migrating the currently running power consuming process or the to-be-run power consuming process to the target secondary terminal, to run the currently running power consuming process or the to-be-run power consuming process by using the target secondary terminal; and
receiving a running result sent by the target secondary terminal;
wherein the selecting a target secondary terminal from the at least two secondary terminals when it is detected that the primary terminal currently runs a power consuming process or is to run a power consuming process comprises:
determining a secondary terminal list from the at least two secondary terminals in a networking process, wherein the secondary terminal list comprises at least one secondary terminal; and
selecting the target secondary terminal from the secondary terminal list based on a migration condition when it is detected that the primary terminal currently runs a power consuming process or is to run a power consuming process, wherein the migration condition comprises: available power meets a power requirement of the currently running power consuming process or the to-be-run power consuming process, and available resources meet a resource requirement of the currently running power consuming process or the to-be-run power consuming process,
wherein the migration condition comprises at least one of the following:
a first-type migration condition that comprises: a power supply supplies power, there is no user operation, and available resources of a secondary terminal are greater than the resource requirement of the currently running power consuming process or the to-be-run power consuming process;
a second-type migration condition that comprises: a power supply supplies power, there is a user operation, and available resources of a secondary terminal are greater than or equal to X resource requirements of the currently running power consuming process or the to-be-run power consuming process;
a third-type migration condition that comprises: a power supply supplies power, a time for which there has been no user operation exceeds a preset time period, and current time falls within a preset time period of a system; or
a fourth-type migration condition that comprises: a battery supplies power, available power of the battery is greater than Y power requirements of the currently running power consuming process or the to-be-run power consuming process, there is no user operation, and available resources of a secondary terminal are greater than or equal to Z resource requirements of the currently running power consuming process or the to-be-run power consuming process, wherein all of X, Y, and Z are greater than or equal to 1; and
wherein priorities of the migration conditions sequentially decrease based on a sequence of the first-type migration condition, the second-type migration condition, the third-type migration condition, and the fourth-type migration condition.

8. The apparatus according to claim 7, wherein the selecting of the target secondary terminal from the secondary terminal list based on a migration condition when it is detected that the primary terminal currently runs a power consuming process or is to run a power consuming process comprises:
when it is detected that the primary terminal currently runs a power consuming process or is to run a power consuming process, starting from a first secondary terminal in the secondary terminal list, obtaining a current target power and current target resources of each secondary terminal on the secondary terminal list;
determining whether the current target power and the current target resources of each secondary terminal on the secondary terminal list meet the migration condition; and
selecting a secondary terminal that meets the migration condition as the target secondary terminal.

9. The apparatus according to claim 8, wherein the obtaining of the current target power and the current target resources that correspond to each of the secondary terminals on the secondary terminal list comprises:
obtaining a current available power and current available resources that correspond to the secondary terminal; and
separately performing normalization processing on the current available power and the current available resources that correspond to the secondary terminal, to obtain the current target power and the current target resources that correspond to the secondary terminal.

10. The apparatus according to claim 7, wherein the selecting of the target secondary terminal from the secondary terminal list based on a migration condition when it is detected that the primary terminal currently runs a power consuming process or is to run a power consuming process comprises:
when it is detected that the primary terminal currently runs a power consuming process or is to run a power consuming process, separately obtaining a current target power and current target resources that correspond to each of secondary terminals in the secondary terminal list;
determining whether the current target power and the current target resources that correspond to each of the secondary terminals in the secondary terminal list meet the migration condition; and
selecting the target secondary terminal from secondary terminals that meet the migration condition.

11. The apparatus according to claim 10, wherein the selecting of the target secondary terminal from the secondary terminals that meet the migration condition comprises:
determining a migration condition type corresponding to each of the secondary terminals that meet the migration condition; and
determining, as the target secondary terminal, a secondary terminal corresponding to a migration condition type with a highest priority.

12. The apparatus according to claim 7, wherein the determining a secondary terminal list from the at least two secondary terminals in a networking process comprises:

in the networking process, obtaining an available power and available resources that correspond to each of the at least two secondary terminals; and determining the secondary terminal list based on the available power and the available resources that correspond to each of the at least two secondary terminals, wherein a secondary terminal in the secondary terminal list meets a preset condition.

13. A non-transitory machine-readable storage medium having instructions stored therein, which when executed by a processor, cause the processor to perform operations, the operations comprising:

selecting a target secondary terminal from at least two secondary terminals when it is detected that a primary terminal currently runs a power consuming process or is to run a power consuming process;

migrating the currently running power consuming process or the to-be-run power consuming process to the target secondary terminal, to run the currently running power consuming process or the to-be-run power consuming process by using the target secondary terminal; and receiving a running result sent by the target secondary terminal;

wherein the selecting a target secondary terminal from the at least two secondary terminals when it is detected that the primary terminal currently runs a power consuming process or is to run a power consuming process comprises:

determining a secondary terminal list from the at least two secondary terminals in a networking process, wherein the secondary terminal list comprises at least one secondary terminal; and selecting the target secondary terminal from the secondary terminal list based on a migration condition when it is detected that the primary terminal currently runs a power consuming process or is to run a power consuming process, wherein the migration condition comprises: available power meets a power requirement of the currently running power consuming process or the to-be-run power consuming process, and available resources meet a resource requirement of the currently running power consuming process or the to-be-run power consuming process;

wherein the migration condition comprises at least one of the following:

a first-type migration condition that comprises: a power supply supplies power, there is no user operation, and available resources of a secondary terminal are greater than the resource requirement of the currently running power consuming process or the to-be-run power consuming process;

a second-type migration condition that comprises: a power supply supplies power, there is a user operation, and available resources of a secondary terminal are greater than or equal to X resource requirements of the currently running power consuming process or the to-be-run power consuming process;

a third-type migration condition that comprises: a power supply supplies power, a time for which there has been no user operation exceeds a preset time period, and current time falls within a preset time period of a system; or a fourth-type migration condition that comprises: a battery supplies power, available power of the battery is greater than Y power requirements of the currently running power consuming process or the to-be-run power consuming process, there is no user operation, and available resources of a secondary terminal are greater than or equal to Z resource requirements of the currently running power consuming process or the to-be-run power consuming process, wherein all of X, Y, and Z are greater than or equal to 1; and wherein priorities of the migration conditions sequentially decrease based on a sequence of the first-type migration condition, the second-type migration condition, the third-type migration condition, and the fourth-type migration condition.

14. The non-transitory machine-readable storage medium according to claim 13, wherein the selecting of the target secondary terminal from the secondary terminal list based on a migration condition when it is detected that the primary terminal currently runs a power consuming process or is to run a power consuming process comprises:

when it is detected that the primary terminal currently runs a power consuming process or is to run a power consuming process, starting from a first secondary terminal in the secondary terminal list, obtaining a current target power and current target resources of each secondary terminal on the secondary terminal list;

determining whether the current target power and the current target resources of each secondary terminal on the secondary terminal list meet the migration condition; and determining a secondary terminal that meets the migration condition as the target secondary terminal.

15. The non-transitory machine-readable storage medium according to claim 14, wherein the obtaining a current target power and current target resources that correspond to each secondary terminal on the secondary terminal list comprises:

obtaining a current available power and current available resources that correspond to the secondary terminal; and separately performing normalization processing on the current available power and the current available resources that correspond to the secondary terminal, to obtain the current target power and the current target resources that correspond to the secondary terminal.

16. The non-transitory machine-readable storage medium according to claim 13, wherein the selecting of the target secondary terminal from the secondary terminal list based on a migration condition when it is detected that the primary terminal currently runs a power consuming process or is to run a power consuming process comprises:

when it is detected that the primary terminal currently runs a power consuming process or is to run a power consuming process, separately obtaining a current target power and current target resources that correspond to each of secondary terminals in the secondary terminal list;

determining whether the current target power and the current target resources that correspond to each of the secondary terminals in the secondary terminal list meet the migration condition; and determining the target secondary terminal from the secondary terminals that meet the migration condition.

17. The non-transitory machine-readable storage medium according to claim 16, wherein the selecting the target secondary terminal from the secondary terminals that meet the migration condition comprises:

determining a migration condition type corresponding to each of the secondary terminals that meet the migration condition; and determining, as the target secondary terminal, a secondary terminal corresponding to a migration condition type with a highest priority.

* * * * *

UNITED STATES PATENT AND TRADEMARK OFFICE
CERTIFICATE OF CORRECTION

| | | |
|---|---|---|
| PATENT NO. | : 12,007,827 B2 | Page 1 of 1 |
| APPLICATION NO. | : 17/641581 | |
| DATED | : June 11, 2024 | |
| INVENTOR(S) | : Xiangyu Niu et al. | |

It is certified that error appears in the above-identified patent and that said Letters Patent is hereby corrected as shown below:

In the Claims

In Column 27, Line 40, in Claim 7, delete "process," and insert -- process; --.

Signed and Sealed this
Thirteenth Day of August, 2024

Katherine Kelly Vidal
*Director of the United States Patent and Trademark Office*